US011785116B2

(12) United States Patent
Kaulbach et al.

(10) Patent No.: US 11,785,116 B2
(45) Date of Patent: *Oct. 10, 2023

(54) SYSTEMS AND METHODS FOR USE IN NETWORK SERVICE INTERFACE BUNDLING

(71) Applicant: MASTERCARD INTERNATIONAL INCORPORATED, Purchase, NY (US)

(72) Inventors: Pete Kaulbach, Bedford (CA); Jerry J. Davis, Wildwood, MO (US); Justin Thomas Katen, Foristell, MO (US); Jim Maus, St. Charles, MO (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 11 days.

This patent is subject to a terminal disclaimer.

(21) Appl. No.: 17/521,626

(22) Filed: Nov. 8, 2021

(65) Prior Publication Data

US 2022/0070275 A1    Mar. 3, 2022

Related U.S. Application Data

(63) Continuation of application No. 16/588,953, filed on Sep. 30, 2019, now Pat. No. 11,172,047.

(51) Int. Cl.
| | |
|---|---|
| *G06F 15/16* | (2006.01) |
| *H04L 67/60* | (2022.01) |
| *G06Q 20/24* | (2012.01) |
| *H04L 41/0803* | (2022.01) |
| *H04L 9/40* | (2022.01) |

(Continued)

(52) U.S. Cl.
CPC ............ *H04L 67/60* (2022.05); *G06Q 20/24* (2013.01); *H04L 41/0803* (2013.01); *H04L 63/083* (2013.01); *H04L 67/01* (2022.05); *H04L 67/02* (2013.01)

(58) Field of Classification Search
CPC ....... H04L 67/10; H04L 67/587; G06F 9/468; G06F 9/5038; G06F 9/542
See application file for complete search history.

(56) References Cited

U.S. PATENT DOCUMENTS 9,753,841 B1    9/2017 Shen et al.
9,811,390 B1 *  11/2017 Ma ........................ G06F 9/5038
(Continued)

*Primary Examiner* — Dustin Nguyen
(74) *Attorney, Agent, or Firm* — Harness, Dickey & Pierce, P.L.C.

(57) ABSTRACT

Systems and methods for use in facilitating application interface (API) interactions are disclosed. One exemplary method includes receiving, by a computing device, a primary API request from a client. The primary API request includes a plurality of parameters in association with a plurality of values. The computing device identifies relationships between the parameters and a plurality of interfaces, and generates a plurality of secondary requests based on the primary API request and the identified relationships. The computing device further transmits each of the plurality of secondary requests to the plurality of interfaces and receives a plurality of secondary responses from the plurality of interfaces. The computing device then generates a primary response based on the secondary responses and transmits the primary response to the client.

19 Claims, 3 Drawing Sheets

(51) Int. Cl.
*H04L 67/02* (2022.01)
*H04L 67/01* (2022.01)

(56) References Cited

U.S. PATENT DOCUMENTS

| | | | |
|---|---|---|---|
| 9,881,390 B2 | 1/2018 | Du | |
| 9,983,860 B1* | 5/2018 | Koty | H04L 67/10 |
| 10,042,685 B1 | 8/2018 | O'Kennedy et al. | |
| 10,362,141 B1* | 7/2019 | Thompson | G06F 9/542 |
| 2004/0139151 A1 | 7/2004 | Flurry et al. | |
| 2006/0031225 A1 | 2/2006 | Palmeri et al. | |
| 2007/0050446 A1* | 3/2007 | Moore | H04L 67/567 |
| | | | 709/223 |
| 2009/0119672 A1* | 5/2009 | Bussard | G06F 9/468 |
| | | | 718/104 |
| 2009/0249296 A1 | 10/2009 | Haenel et al. | |
| 2010/0077473 A1 | 3/2010 | Ohta et al. | |
| 2012/0210335 A1 | 8/2012 | Salt et al. | |
| 2013/0132584 A1 | 5/2013 | Palladino et al. | |
| 2013/0282748 A1 | 10/2013 | Liensberger et al. | |
| 2014/0101045 A1 | 4/2014 | Santiago, Jr. et al. | |
| 2014/0258559 A1 | 9/2014 | Vendrow et al. | |
| 2014/0344403 A1 | 11/2014 | Arnault et al. | |
| 2015/0058054 A1 | 2/2015 | Basu et al. | |
| 2015/0128103 A1 | 5/2015 | Stratton et al. | |
| 2015/0170145 A1 | 6/2015 | Patel et al. | |
| 2016/0379213 A1 | 12/2016 | Isaacson et al. | |
| 2018/0004767 A1 | 1/2018 | Lamanna et al. | |
| 2018/0210768 A1 | 7/2018 | Dai et al. | |
| 2019/0227856 A1 | 7/2019 | Xu et al. | |
| 2019/0332706 A1 | 10/2019 | Leon et al. | |
| 2020/0159591 A1 | 5/2020 | Rudolph et al. | |
| 2021/0099544 A1 | 4/2021 | Kaulbach et al. | |

* cited by examiner

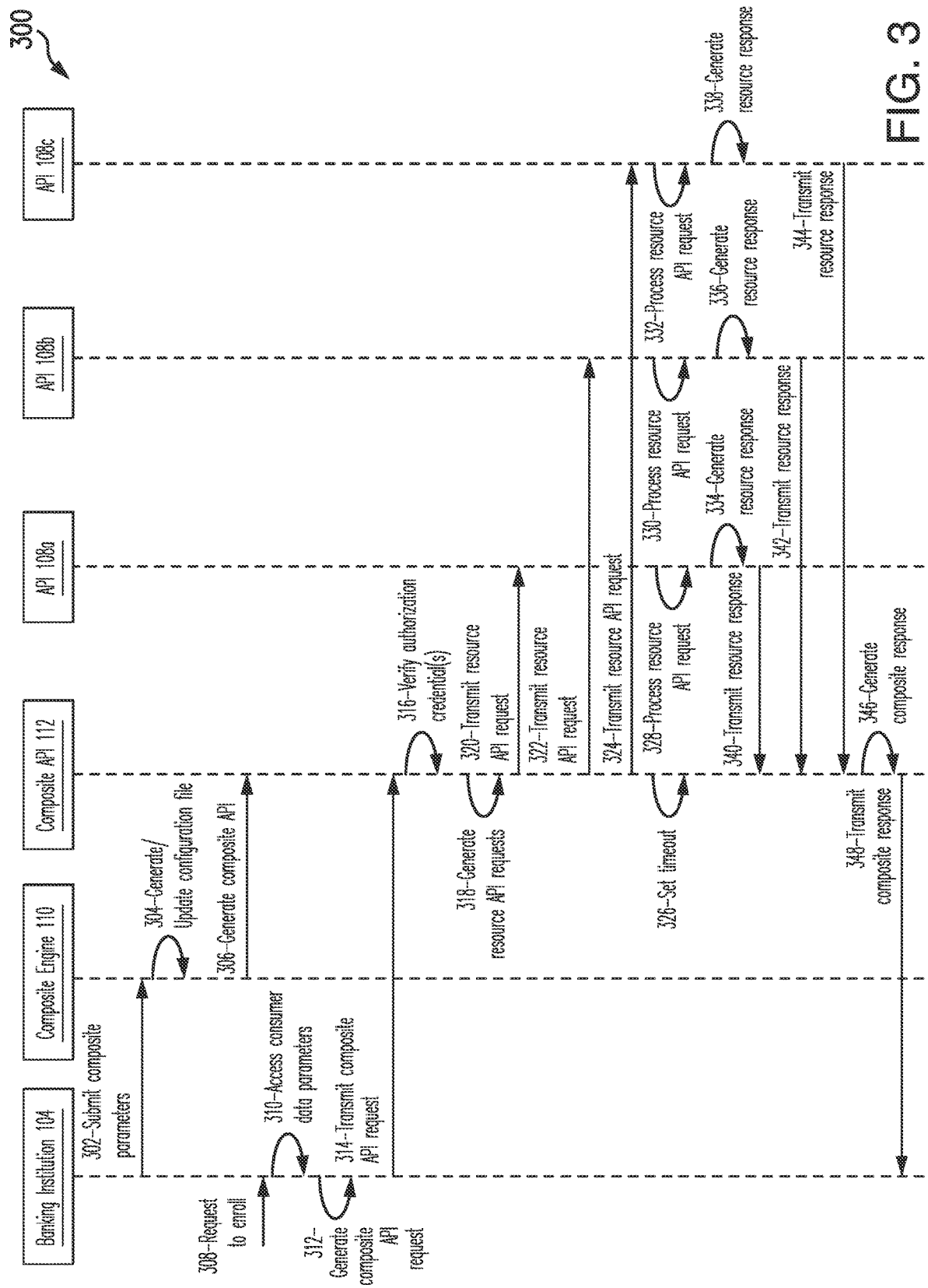

SYSTEMS AND METHODS FOR USE IN NETWORK SERVICE INTERFACE BUNDLING

CROSS-REFERENCE TO RELATED APPLICATION

This application is a continuation of U.S. patent application Ser. No. 16/588,953 filed on Sep. 30, 2019. The entire disclosure of the above application is incorporated herein by reference.

FIELD

The present disclosure generally relates to systems and methods for use in network service interface bundling, and in particular, to systems and methods for use in compiling one-point interface composites for a network, where each composite is suitable to interact with multiple different network resource interfaces.

BACKGROUND

This section provides background information related to the present disclosure which is not necessarily prior art.

Networks often provide computing and/or network resources for use by users (broadly, clients) through the networks. In so doing, the networks may expose different application programming interfaces (APIs) to the clients as part of underlying services, whereby the clients are able to call ones of the resources via multiple APIs to take advantage of the underlying computing and/or network services. For each of the resources, the clients call the specific APIs, whereby the networks provide the corresponding resources. As such, in the context of providing services to a client, the client may call multiple different APIs.

DRAWINGS

The drawings described herein are for illustrative purposes only of selected embodiments and not all possible implementations, and are not intended to limit the scope of the present disclosure.

FIG. 3 is an exemplary method, which can be implemented in the system of FIG. 1, for use in bundling different ones of the service interfaces to the composite interface.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

Resources offered by networks (e.g., payment networks, etc.) are often accessible from outside the networks, for example, through various different interfaces. In one example, different application programing interfaces (APIs) are constructed for each of the resources, where the APIs are generally specific to a given one of the resources (e.g., a customer authentication service, a billing service, a tokenization service, a digital identity service, etc.). The different APIs may then be exposed, by the networks, in response to API calls by the clients, to access different ones of the resources of the networks. The client may be required to call multiple different ones of the APIs in order to access resources as part of accessing one or more underlying services for a given need. For example, providing a loyalty service may require multiple different network resources and, thus, require a client to call different APIs associated with customer authentication, tokenization of payment account credentials, etc. For each of the APIs, the user may be required to conform to the specific format and/or requirements of the API, which may include differences between the APIs, and to further adapt its own conventions to the API (e.g., naming conventions for API parameters, etc.). Uniquely, the systems and methods herein provide for compilation of composite interfaces, each of which permits a user to have a one-point interface for touching one or more services offered by a network. In this manner, the user is able to request and be provided with a composite interface, which sits between the client and the different multiple APIs of the network, to provide seamless interaction therebetween, while also enabling preservation of client conventions and existing services and/or APIs, etc.

Figure 1:
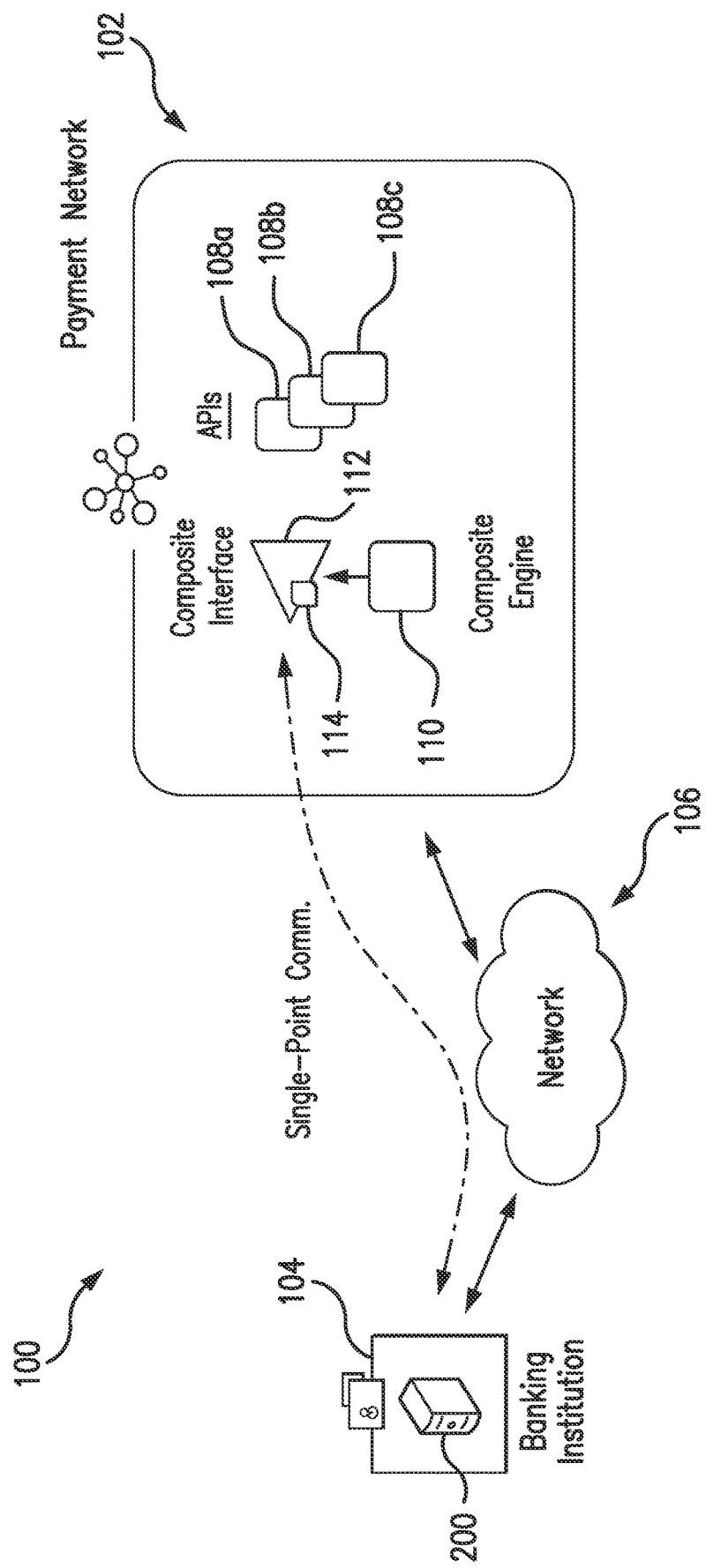
FIG. 1 illustrates an exemplary system for use in bundling service interfaces for a network, per client, in order to provide composite interfaces for the user to interact with multiple resources of the network.

FIG. 1 illustrates an exemplary system 100 for use in bundling different resource interfaces to a composite interface and facilitating API interactions, in which one or more aspects of the present disclosure may be implemented. Although parts of the system 100 are presented in one arrangement, other embodiments may include the same or different parts arranged otherwise, depending, for example, on types of services offered in the system 100, accessibility to the services to different users, presence of different users of the services in the system 100, etc.

The illustrated system 100 generally includes a payment network 102 and a banking institution 104 (broadly, a user), each coupled to (and in communication with) network 106. The network 106 may include, without limitation, one or more local area networks (LANs), wide area networks (WANs) (e.g., the Internet, etc.), mobile networks, virtual networks, other networks as described herein, and/or other suitable public and/or private networks capable of supporting communication among two or more of the illustrated parts, or any combination thereof. In one example, the network 106 includes multiple networks, where different ones of the multiple networks are accessible to different ones of the illustrated components in FIG. 1. In particular, the payment network 102 and the banking institution 104 may be connected via a private network for processing payment-related transactions and, separately, the payment network 102 may be connected to the banking institution 104 through a public network, such as the Internet, to facilitate other interactions.

Generally in the system 100, the payment network 102 is a payment service provider, or more generally, a service host herein (e.g., a provider of or host for services, etc.), which is configured to facilitate payment account transactions to payment accounts (such as those issued by the banking institution 104). The payment network 102 may include, for example, and without limitation, the Mastercard® network, the VISA® network, the American Express® network, etc. Also in the system 100, the banking institution 104 includes a financial institution that issues payment accounts to consumers (not shown) (e.g., whether individual persons, entities, companies, businesses, etc.). The accounts, which may include credit accounts, debit accounts, prepaid accounts, etc., may then be used by the consumers to fund payment account transactions for the purchase of products (e.g., goods or services, etc.). It should be appreciated that the entities other than banking institutions may be in communication with the payment network 102, for example, as clients thereof, etc., whereby the features of the present disclosure described herein with reference to the banking institution 104 may similarly be applicable to the other entities.

In general, the banking institution 104 is a user (or client) of the payment network 102, whereby the banking institution 104 subscribes and/or accesses one or multiple services (broadly, resources) offered by the payment network 102. Often, the services are associated with payment account transactions (and authorization, clearing or settlement of payment account transactions), but should not be considered limited thereto. For example, the payment network 102 may also provide virtual wallet services, fraud services, billing services, digital identity services, monitoring services, alerts and controls services (e.g., fraud alert and spend control services, etc.), loyalty services (e.g., airport lounge access services (e.g., Mastercard® Airport Experiences (MCAE), Mastercard® Benefits Optimizer services (e.g., where a user can view his/her benefits digitally and where issuers can allow their consumers to select benefits from a list of available benefits, etc.), Boingo® Global WiFi services, insurance services (including claim submission and claim status tracking, offer services (e.g., through Supreenda and/or a personalized card linked to offers programs, etc.), etc.), etc.), and "pay with rewards" services, or subsets of the services associated therewith (e.g., login services, etc.), etc. It should be appreciated that the payment network 102 may provide such services locally (i.e., at the payment network 102) or via an entity external to the payment network 102.

In this exemplary embodiment, each of the services offered by the payment network 102 is associated with one or more application programing interfaces (APIs) individually accessible by one or more clients (e.g., banking institution 104, etc.). For illustration in FIG. 1, the payment network 102 is configured to expose three different exemplary APIs 108*a-c* to the clients. The API 108*a* is configured to provide consent services (or resources) to the clients and may be referred to as the Consent Services API 108*a*. API 108*b* is configured to provide lifecycle services (or resources) to the clients and may be referred to as the Lifecycle Services API 108*b*. And, API 108*c* is configured to provide loyalty services (or resources) to the clients and may be referred to as the Loyalty Services API 108*c*. As examples, the Consent Services API 108*a* may be configured to enroll a consumer's consent to terms and conditions associated with the payment network 102, as well as consent to underlying benefits and/or services (e.g., any one or more of the services mentioned above, such as loyalty services (e.g., Boingo® Global WiFi or MCAE services, etc.), etc.). The Lifecycle Services API 108*b* may be configured to enroll a consumer's personal information with the payment network 102 and/or to pass the consumer's personal information to an appropriate service external of the payment network 102 where the payment network 102 does not provide the services locally (e.g., where the payment network 102 is not the data controller for the services, etc.), whereby the external services may be configured to enroll the consumer's personal information. And, the Loyalty Services API 108*c* may be configured to enroll a consumer with consumer loyalty services (e.g., Boingo® Global WiFi or MCAE services, etc.) in connection with a specific payment account for the consumer. However, in this latter example, for the payment network 102 to actually authorize the consumer for the loyalty services, the client's consent to the terms and conditions, personal information, and loyalty services enrollment must be invoked via the respective APIs 108*a-c*. That said, each of the APIs 108*a-c* may broadly be referred to as a resource interface.

In connection therewith, each of APIs 108*a-c* is configured to be called by the clients (e.g., banking institution 104, etc.) and to provide service(s) in response thereto, whereby service(s) are accessible by the clients via the API(s) 108*a-c*. In particular, each of APIs 108*a-c* is configured in accordance with the JavaScript Object Notation (JSON) format, whereby each API of APIs 108*a-c* is configured to receive an API request in a JSON format, process the API request in accordance with attribute values (broadly, parameters) specified in the request, and return an API response in a JSON format to the client. In one or more other embodiments, one or more of the APIs 108*a-c* may be configured in accordance with one or more other formats (e.g., an XML format, etc.), whereby the API(s) 108*a-c* may be configured to receive an API request in the other format(s) and return an API response in the same other format(s) to the client.

With continued reference to FIG. 1, in this exemplary embodiment, each of the APIs 108*a-c* is configured to receive an API request including a plurality of segments. The segments include a uniform resource locator (URL) (or a uniform resource indicator (URI)), a method, a list of headers, and a body. The URL incudes a specification of the resource(s) requested by the client. The method includes a specification of the action requested by the client (e.g., GET (retrieve a resource), POST (create a new resource), PUT (edit/update an existing resource), DELETE (delete a resource), etc.). The list of header(s) provides meta-information about the API request, (e.g., an authorization credential(s) of the client for the resource requested; an API response format requested by the client; an API response media type requested (e.g., text/HTML or text/JSON); etc.). And the body includes parameters or variables (broadly, resource parameters), in association with data values, submitted to the API(s) 108*a-c* for use in carrying out the request.

For example, the Loyalty Services API 108*c* is configured to receive an API request including a plurality of segments, where the segments may include a URL of "/loyalty/benefits/users" specifying the Loyalty Services resources requested by the client, a POST method (specifying that the client is seeking to enroll a consumer for loyalty services), a list of headers including an authorization credential(s) (e.g., a token, etc.) for the client to access the resources provided via the API 108*c*, and a body including parameters or variables (broadly, "resource parameters"), in association with data values, accepted and/or required by the API 108*c* for enrolling the consumer with the loyalty services. Example resource parameters, each in association with an example value, accepted and/required in a body of an API request to the Loyalty Services API 108*c* are shown in Table 1.

TABLE 1

| Loyalty Services API 108c: Resource Request Parameters | Data Values |
|---|---|
| addressLine1 | 1111 Sample Blvd. |
| city | O'Fallon |
| country | USA |

TABLE 1-continued

Loyalty Services API 108c:
| Resource Request Parameters | Data Values |
| --- | --- |
| postalCode | 63368 |
| state | MO |
| email | sally.cardholder@domain.com |
| firstName | Sally |
| lastName | Cardholder |
| pan | 1111222333444 |
| cardExpiryDate | January 2023 |
| nameOnCard | Sally D Cardholder |
| ica | 1234 |
| cardProductType | MasterCard Business |
| accountType | JointMember |

Similarly, the Consent Services API 108a is configured to receive an API request including a plurality of segments, where the segments may include a URL of "/api/v1/consent" specifying the Consent Services resources requested by the client, a POST method (specifying that the client is seeking to enroll a consumer's content to terms and conditions), a list of headers including an authorization credential(s) (e.g., a token, etc.) for the client to access the resources provided via the API 108a, and a body including data values in association with parameters or variables (broadly, "resource parameters") accepted and/or required by the API 108a for enrolling the consumer's consent. Example resource parameters, in association with example data values, accepted and/or required for a body of an API request to the Consent Services API 108a are shown in Table 2.

TABLE 2

Consent Services API 108a:
| Resource Request Parameters | Data Values |
| --- | --- |
| userId | bankingIntitution104 |
| userName | sally.cardholder@domain.com |
| local | en_US |
| consentedDate | 2019 Feb. 3 |
| consentType | author-legal-content-document |
| serviceCode | pc |
| serviceFucntionCode | pc-reg |
| useCategoryCode | tc |
| uuid | k3930532-ae8e-03ac-2047-39ic392c6ff |
| agreed | true |
| currentVersion | 1.1 |
| serviceName | offers |
| language | en |
| country | US |

The Lifecycle Services API 108b is configured to receive an API request including a plurality of parameters and, in particular, a URL of "/consumer/users" specifying the Lifecycle Services resources requested by the client, a POST method (specifying that the client is seeking to enroll a consumer's personal information with the payment network 102), a list of headers including an authorization credential(s) (e.g., a token, etc.) for the client to access the resources provided via the API 108b, and a body including parameters or variables (broadly, "resource parameters"), in association with data values, accepted and/or required by the API 108b for enrolling the consumer's personal information. Example resource parameters, in association with example data values, accepted and/or required for a body of an API request to the Lifecycle Services API 108b are shown in Table 3.

TABLE 3

Lifecycle Services API 108b:
| Resource Request Parameters | Data Values |
| --- | --- |
| Address Parameters | |
| country | US |
| locality | O'Fallon |
| postalCode | 63368 |
| streetAddress | 1111 Sample Blvd. |
| active | false |
| displayName | Sally Cardholder |
| emails | sally.cardholder@domain.com |
| externalID | bankingIntitution104 |
| locale | en-US |
| familyName | Cardholder |
| givenName | Sally |
| honorificPrefix | Ms. |
| honorificSuffix | Sr. |
| middleName | S. |
| preferredLanguage | En |
| timezone | CST |
| userName | sally.cardholder@domain.com |

Each of the APIs 108a-c is then configured to, in response to receiving the corresponding API request (e.g., from the banking institution 104, etc.), process the API request in accordance with the segments included therein. For example, the API 108c is configured to identify that the API request is for Consent Services based on the URL included in the API request and to verify the client's authorization to request Consent Services via the API 108c based on the authorization credential(s) included in the list of headers of the API request. Based on successful verification and the POST method specification, the API 108c is configured to enroll a consumer's consent to terms and conditions in accordance with the data values associated with the resource parameters included in the body of the API request. APIs 108a-b are similarly configured.

Upon processing the API request, each of the APIs 108a-c is configured to generate and return a response to the client that submitted the API request (e.g., the banking institution 104, etc.). In the exemplary embodiment, the response is formatted in accordance with the JSON format and includes a plurality of segments, including a status code (e.g., in a status-line segment, etc.), a list of header(s), and a body. The status code indicates the status of the request (e.g., 200 for success, etc.), as requested by the client via the API request, including whether the service processing was successful or failed. The header list of header(s) provides meta-information about the response (e.g., response type (e.g., text/HTML or text/JSON, etc.), etc.), thereby indicating how the computing system of the client is to interpret the response. And the body includes parameters or variables, in association with data values. Table 4 below and the Computer Code Appendix below show example parameters or variables, each in association with a data value included in a response returned to a client that submitted API requests to the Consent Services API 108a and the Lifecycle Services API 108b, respectively (e.g., where a "constentedDate" parameter returned by API 108a is associated with a "2019-02-03" data value, etc.). A response from the Loyalty Services API 108c may be structured similarly, yet include one or more different parameters specific to the API 108c and/or data values in association therewith.

TABLE 4

Consent Services API 108a: Resource Response Parameters

```
{
   "userid":"",
   "userName": "sally.cardholder@domain.com ",
   "consentData": [
      {
         "uuid": " k3930532-ae8e-03ac-2047-39ic392c6ff",
         "serviceCode": " pc",
         "serviceName": "B2B User Provisioning",
         "serviceFunctionCode": " pc-reg ",
         "useCategoryCode": "tc",
         "currentVersion": "1.1",
         "locale": "en_US",
         "agreed": true,
         "consentedDate": "2019-02-03",
         "consentType": "author-legal-content-document "
      }
      ]
}
```

The client (e.g., a computing system of the client that submitted the API request, etc.) is then configured to react according to the responses received from the APIs 108a-c (e.g., notifying the consumer that he/she has been authorized for the reward points program at the payment network 102 when the status code of each response indicates successful processing (e.g., 200, etc.), etc.).

With that said, inefficiencies exist on prior manners of configuring client computing systems for accessing APIs and, in particular, requiring clients to invoke multiple disparate APIs as part of invoking a larger service and/or invoking one or more APIs with appropriate parameters. For example, a client (such as banking institution 104) seeking to configure a computing system (e.g., computing device 200, etc.) to authorize a consumer for the reward points program at the payment network 102 is tasked with assembling code to cause the computing system to generate three disparate API requests for the three disparate APIs 108a-c. Further, consistent with the above, in connection with generating the multiple API requests, the code must configure the computing system to generate the API requests with each having their own service specific attributes (e.g., server-specific URLs, service-specific parameters for the body, service-specific header lists (e.g., with service specific credentials, etc.), etc.). What's more, the client's naming and formatting conventions for data parameters may be different, at least in part, from the data parameter naming and formatting conventions of the APIs 108a-c, whereby there is often an incompatibility between the computing systems of the client and the APIs 108a-c.

For instance, in the exemplary system 100, the banking institution 104 may store consumer data parameters in a database having one or more consumer data tables. Each data table may store data for multiple consumers of the banking institution 104. In particular, a row of each table may be assigned to one of the multiple consumers. The row for the consumer, then, may include a plurality of column fields, where each field name represents a different data parameter, and each field value represents consumer data for the parameter. Table 5 includes example data table field names and values associated therewith as may be included in a data table of the database of the banking institution 104.

TABLE 5

| Consumer Data Table Field Name | Data Value |
| --- | --- |
| streetAddress | 1111 Sample Blvd. |
| locality | O'Fallon |
| country | USA |
| postalCode | 63368 |
| region | MO |
| value | sally.cardholder@domain.com |
| givenName | Sally |
| familyName | Cardholder |
| pan | 1111222333444 |
| cardExpiryDate | January 2023 |
| nameOnCard | Sally D Cardholder |
| ica | 1234 |
| cardProductType | MasterCard Business |
| accountType | JointMember |

As can be appreciated, the example values in the data table shown in Table 5 generally include the type of values required by the Loyalty Services API 108c. However, the values are stored by the banking institution 104 in association with field names (broadly, parameters) that are, at least in part, incompatible with the parameters required by the Loyalty Services API 108c. For example, the Loyalty Services API 108c requires the consumer's street address (e.g., "1111 Sample Blvd.," etc.) to be provided as a value in the body of the API request for the "addressLine1" parameter, as shown above in Table 1. The banking institution 104, however, stores the consumer's address in association with the "streetAddress" field name (or parameter), as shown in Table 4. A similar issue exists for the "city," "email," "firstName," and "lastName" of the Loyalty Services API 108c request body parameters and the "locality, value, givenName, and "familyName" field names in the example data table shown in Table 5, respectively. As such, in order to generate and submit an API request to Loyalty Services API 108c, the banking intuition 104 is burdened with generating code to configure its computing system to translate its parameter conventions to those required by the API 108c. This burden similarly exists for APIs 108a-b.

Further, even where code is generated by the banking institution 104 to configure its computing systems to generate API requests in accordance with the appropriate parameters, each API 108a-c must be requested by the banking institution 104 independent of the other(s) in order for the payment network 102 to actually authorize the consumer for the reward points program, which in and of itself introduces complications. Further, the APIs 108a-c are configured to asynchronously process the API requests and return responses thereto according to different time intervals, even where the API requests are simultaneously submitted by the banking institution 104, due to the independence of APIs 108a-c. In this manner, the banking institution 104 must generate code to configure its computing systems to await and coordinate three separate, asynchronous responses from the payment network 102, in order to confirm authorization of the consumer's enrollment in the reward points program at the payment network 102. This introduces even more complications.

Uniquely, the system 100 includes a composite engine 110 configured to compile composite interfaces generated by the composite engine 110. In particular, each composite interface permits a client (e.g., the banking institution 104, etc.) to have a customizable one-point interface for touching one or more services offered by a network (e.g., a loyalty service offered by payment network 102 and/or one or more other services described above, etc.), in a manner that improves upon conventional API services, including JSON API services, to thereby address one or more of the foregoing issues.

In connection therewith, the composite engine 110 is discussed below for exemplary purposes, where the composite engine 110 is configured to provide for a composite API 112 (broadly, a composite interface 112), which permits the banking institution 104 (as the client of the payment network 102) to have a customized one-point interface for touching the Consent Services, Consumer Lifecycle Services, and Loyalty Services offered by the payment network 102 (via APIs 108a-c), in order to, for example, authorize a consumer of the banking institution 104 for a loyalty service offered by the payment network 102 (e.g., Boingo® Global WiFi or MCAE services, etc.). However, it should be appreciated that the composite engine 110 may be configured to provide one or more other composite APIs to permit the banking institution 104 and/or one or more other clients to each have a customized one-point interface for touching any of a variety of services offered by a network (via any of a variety of APIs).

In either case, the client is able to be provided with, and submit requests to, a composite API, which sits between the client and the different multiple APIs of the network, to provide seamless interaction between the client and the one or more of the multiple different APIs of the payment network 102, while also enabling preservation of client conventions and existing services and/or APIs, etc.

Figure 2:
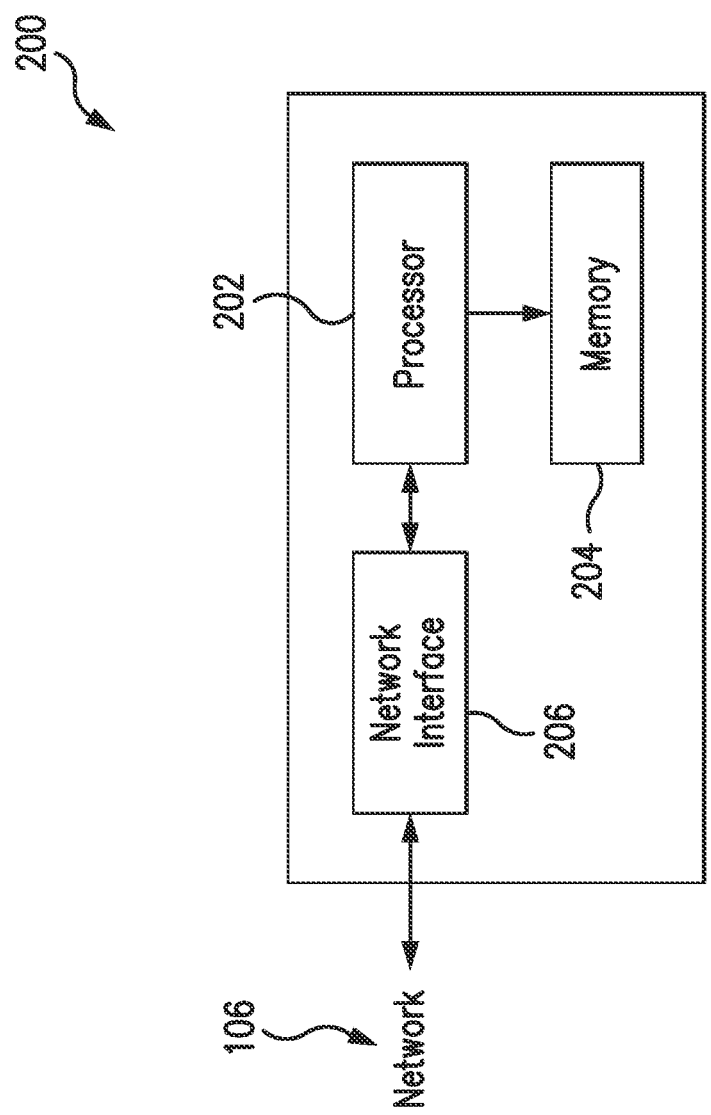
FIG. 2 is a block diagram of an exemplary computing device that may be used in the system of FIG. 1.

FIG. 2 illustrates an exemplary computing device 200 that can be used in the system 100. The computing device 200 may include, for example, one or more servers, workstations, personal computers, laptops, tablets, smartphones, other suitable computing devices, etc. In addition, the computing device 200 may include a single computing device, or it may include multiple computing devices located in close proximity, or multiple computing devices distributed over a geographic region, so long as the computing devices are specifically configured to function as described herein. In the exemplary embodiment of FIG. 1, the banking institution 104 includes and/or is implemented in, computing device 200, coupled to the network 106. In addition, the payment network 102 in general, as well as the APIs 108a-c (individually or together), the composite engine 110, and the composite API 112, may each be considered a computing device, or may be considered including and/or implemented in a computing device, consistent with the computing device 200. With that said, the system 100 should not be considered to be limited to the computing device 200, as described below, as different computing devices and/or arrangements of computing devices may be used. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, configuration files, configuration rule sets, and/or other data or data structures suitable for use as described herein. Furthermore, in various embodiments, computer-executable instructions may be stored in the memory 204 for execution by the processor 202 to cause the processor 202 to perform one or more of the functions described herein (e.g., one or more of the operations in method 300, etc.), such that the memory 204 is a physical, tangible, and non-transitory computer readable storage media. Such instructions often improve the efficiencies and/or performance of the processor 202 and/or other computer system components configured to perform one or more of the various operations herein, whereby the computing device 200 may be transformed into a special-purpose computing device. It should be appreciated that the memory 204 may include a variety of different memories, each implemented in one or more of the functions or processes described herein.

Further, the illustrated computing device 200 also includes a network interface 206 coupled to (and in communication with) the processor 202 and the memory 204. The network interface 206 may include, without limitation, a wired network adapter, a wireless network adapter (e.g., a near field communication (NFC) adapter, a Bluetooth adapter, etc.), a mobile network adapter, or other device capable of communicating to one or more different networks, including the network 106.

Referring again to FIG. 1, the composite engine 110 is configured by executable instructions to operate as described herein (e.g., to compile one or more composite interfaces, etc.). In particular, the composite engine 110 is configured to generate the composite API 112 (broadly, the composite interface) for the banking institution 104 (broadly, for a client) based on a configuration file 114 stored in memory 204 (e.g., coupled to the composite engine 110, etc.). The configuration file 114 includes a request parameter configuration rule set for each of the APIs 108a-c (e.g., "Consent_Services_API_Configuration_Rule_Set.json," "Consumer_Lifecycle_Services_API_Configuration_Rule_Set.json," and "Loyalty_Services_API_Configuration_Rule_Set.json," etc.) and associates (or links) each resource request parameter configuration rule set with the respective API 108a, b, or c. Exemplary code segments are illustrated below for a resource request parameter configuration rule set for the Consumer Lifecycle Services API 108b and the Loyalty Services API 108c, respectively.

Consumer Life Cycle Services Request Parameter Configuration Rule Set

```
[
  {
    "operation": "shift",
    "spec": {
      "data": {
        "user": {
          "addresses": "addresses",
          "active": "active",
```

Consumer Life Cycle Services Request Parameter Configuration Rule Set

```
            "displayName": "displayName",
            "emails": "emails",
            "entitlements": "entitlements",
            "userId": "externalId".
            "groups": "groups",
            "id": "id",
            "ims": "ims",
            "locale": "locale",
            "meta": "meta",
            "name": "name",
            "nickName": "nickName",
            "phoneNumbers": "phoneNumbers",
            "photos": "photos",
            "preferredLanguage": "preferredLanguage",
            "profileUrl": "profileUrl",
            "roles": "roles",
            "schemas": "schemas",
            "title": "title",
            "timezone": "timezone",
            "userName": "userName",
            "userType": "userType",
            "identifications":
"urn:ietf:params:scim:schemas:extension:mastercard:2\\.0:User:PersonalInformation.identificatio
ns",
            "urn:ietf:params:scim:schemas:extension:mastercard:2.0:User:Preferences":
"urn:ietf:params:scim:schemas:extension:mastercard:2.0:User:Preferences"
         }
      }
   }
 }
]
```

Loyalty Services Request Parameter Configuration Rule Set

```
{
  "operation": "shift",
    "spec": {
       "data": {
          "user": {
             "addresses": {
                "*": {
                    "streetAddress": "addressLine1",
                    "locality": "city",
                    "country": "country",
                    "postalCode": "postalCode",
                    "region": "state"
                 }
              },
              "emails": {
                 "*": {
                    "value": "email"
                 }
              },
              "name": {
                 "givenName": "firstName",
                 "familyName": "lastName"
              }
          },
          "productsObj": {
             "benefits": {
                "accounts": {
                   "*": {
                      "pan": "pan",
                      "cardExpiryDate": "cardExpiryDate",
                      "nameOnCard": "nameOnCard",
```

-continued

Loyalty Services Request Parameter Configuration Rule Set

```
                      "object": {
                         "ica": "ica",
                         "cardProductType": "cardProductType",
                         "accountType": "accountType"
                      }
                   }
                }
             }
          }
       }
    }
}
```

Consistent with the above, each request parameter configuration rule set defines a relationship between one or more resource parameters required and/or accepted by the respective API 108a, b, or c (e.g., the resource parameters identified in Tables 1-3, etc.) and one or more parameters for the composite API 112 (broadly, composite parameters). Each resource request parameter configuration rule set also defines a relationship between the resource request parameters and composite request parameters included therein and the corresponding API 108a, b, or c. In the example system 100, the configuration file 114 includes a similarly structured resource request parameter configuration rule set for the Consent Services API 108a (e.g., "Consent_Servies_API_Configuratin_Rule_Set.json", etc.). In this manner, the configuration file 114 is comprised of multiple configuration files in the example system 100. However, in one or more other embodiments, a configuration file may be comprised of a single file (e.g., a single JSON file, etc.).

The composite engine 110 is configured to include and/or modify composite parameters in the configuration file 114 for each resource request parameter configuration rule set for APIs 108a-c based on one or more inputs from the banking institution 104. In particular, in the example system 100, the composite engine 110 is configured, through one or more interfaces, to solicit and/or receive the composite parameters for each parameter configuration rule set for APIs 108a-c from the banking institution 104 and/or an operator associated with the composite engine 110 (via the network 106 and/or the payment network 102), whereby the composite engine 110 is configured to generate and/or update, modify, etc., the configuration file 114 (and request parameter configuration rule sets included therein) to include the composite parameters solicited and/or received thereby. Further, the composite engine 110 is configured, through the one or more interfaces, to solicit and/or receive each composite parameter from the banking institution 104 in association with a corresponding resource parameter, whereby the banking institution 104 is permitted, by the composite engine 110, to submit and/or identify specific, customized composite parameters (e.g., consistent with conventions of the banking institution 104 (e.g., the banking institution's data field names shown in Tables 1-3, etc.), etc.).

In the exemplary embodiment, the composite engine 110 is configured to solicit and/or receive the composite parameters from the banking institution 104 and/or an operator associated with the composite engine 110 via network 106 through a customization API, whereby the composite parameters (in association with their corresponding resource parameters) may be solicited and/or received via one or more API requests to the customization API. In one or more other embodiments, the composite engine 110 may be configured to solicit and/or receive the composite parameters form the banking institution 104 and/or an operator associated with the composite engine 110 via one or more graphical user interfaces (GUIs) (e.g., a GUI of a web service, etc.). The composite engine 110 may even be configured, in one or more other embodiments, to receive the configuration file 114 from the banking institution 104 (e.g., via network 106, etc.), whereby the banking institution 104 is permitted to define the relationship between one or more resource parameters and one or more composite parameters within the configuration file 114.

In connection with generating the composite API 112, the composite engine 110 is configured to define the composite API 112 to accept and/or require each composite parameter (e.g., "streetAddress, "locality," "country," "region," etc.) identified in the configuration file 114 and, in particular, each of the parameter configuration rule sets. In this manner, the composite API 112 is configured, by the composite engine 110, to receive, from the banking institution 104, an API request including each composite parameter identified in the configuration file 114, in association with a data value for the corresponding composite parameter (e.g., the data values shown in Tables 1-3, etc.). The API request received by the composite API 112 is referred to herein as a composite (or primary) API request. As should be appreciated, by basing the generation of the composite API 112 on the configuration file 114, which in turn includes customizable composite parameters in accordance with conventions of the banking institution 104, the composite API 112 is configured, by the composite engine 110, to provide a composite API 112 that enables preservation of conventions of the banking institution 104. As should be appreciated, the customizable parameters are generally illustrated on the left of each example request parameter configuration rule set code segment shown above (i.e., for the "streetAddress": "addressLine1" of the Loyalty Services Request Parameter Configuration Rule Set, the "streetAddress" is a customizable parameter and the "addressLine1" is a parameter required by the Loyalty Services API 108c, etc.)

In the example system 100, the composite API 112 is configured, by the composite engine 110, in accordance with the JSON format, whereby the composite API 112 is configured to receive the composite API request in a JSON format, process the API request in accordance with attribute values (broadly, parameters) specified in the request, and return an API response in a JSON format to the banking institution 104. In one or more other embodiments, the composite API 112 may be configured, by the composite engine 110, in accordance with another format (e.g., an XML format, etc.), whereby the composite API 112 may be configured to receive an API request in the other format(s) and return an API response in the other format(s) to the client.

With that said, in an implementation of the system 100, the composite API 112 is configured, by the composite engine 110, to receive a composite API request via the network 106 from the banking institution 104 including a plurality of segments. The segments include a uniform resource locator (URL) (or a uniform resource indicator (URI)), a method, a list of headers, and a body. The URL (or URI) is for (or, incudes a specification of) the composite resources requested by the banking institution 104 (e.g., "/api/composite-services"). The method includes a specification of the action requested by the banking institution 104 (e.g., GET (retrieve a resource), POST (create a new resource), PUT (edit/update an existing resource), DELETE (delete a resource), etc.). The list of header(s) of the composite API request provides meta-information about the API request, (e.g., an authorization credential(s) of the banking institution 104 for the resource requested; an API response format requested by the banking institution 104; an API response media type requested (e.g., text/HTML or text/JSON); etc.).

And, the body of the composite API request includes parameters or variables (broadly, composite parameters), in association with data values, submitted to the composite API 112 for use in carrying out the composite request. An example excerpt of a body of a composite API request is illustrated below. It should be appreciated that this example excerpt of the composite API request includes parameters customized by the banking institution 104 that are consistent with the conventions of the banking institution 104 (e.g., for the "streetAddress," "locality," and "region" parameters, etc.), despite their inconsistency with parameters accepted by one or more resource APIs (e.g., the "addressLine1," "city," and "state" parameters required by API 108c, etc.)

Composite API Request

```
{
  "data": {
    "user": {
      "addresses": [
        {
          "country": "USA",
          "locality": "O'Fallon",
          "streetAddress": "1111 Sample Blvd.",
          "postalCode": "63368",
          "region": " MO "
        }
      ],
```

Composite API Request

```
"preferredLanguage": "en-US",
"emails": [
    {
        "value": " sally.cardholder@domain.com"
    }
],
"name": {
    "familyName": "Sally",
    "givenName": "Cardholder"
},
"identifications": [
    {
        "country": "USA",
        "type": "CPF",
        "value": "688.***.***-73"
    }
],
"userId": "bankingIntitution104",
"userName": "sally.cardholder@domain.com"
},
"products": [
    {
        "product": "benefits",
        "accounts": [
            {
                "pan": "1111222333444",
                "nameOnCard": "Sally S. Cardholder",
                "cardExpiryDate": "01/2023",
                "cvcCode": "***",
                "object": {
                    "accountType": "SingleMember",
                    "ica": "1234",
                    "cardProductType": "MasterCard Business "
                }
            }
        ]
    }
]
}
```

In response to receiving the API request, the composite API 112 is configured, by the composite engine 110, to verify the banking institution's authorization to call the composite API 112 based on the authorization credential(s) (e.g., a consumer key identifier, etc.) included in the list of headers of the composite API request. In connection therewith, in the example system 100, the compose engine 110 stores an authorization for a consumer key identifier for the banking institution 104. The API request, then, includes a Public-Key Cryptography Standards (PKCS) #12 key for the banking institution 104 (broadly, a client key) (e.g., in the list of headers, etc.). During establishment of a connection between the banking intuition 104 and the composite API 112 (e.g., OAuth1.0a connection establishment, etc.), the composite API 112 is configured, by the composite engine 110, to convert the PKCS #12 key into a consumer key identifier for the banking institution 104 in the list of headers. The composite API 112 is configured, by the composite engine 110, to then verify the banking institution's authorization to call the composite API 112 based on a successful match of the consumer key identifier in the list of headers of the API request and the consumer key identifier for the banking institution 104 stored by the composite engine 110. Based on successful verification, the composite API 112 is configured, by the composite engine 110, to process the composite API request and generate and return a response to the banking institution 104 in response to the composite API request. With that said, it should be appreciated that in one or more other embodiments, the composite API 112 may be configured, by the composite engine 110, to verify the banking institution's authorization to call the composite API 112 in one or more other manners.

With continued reference to FIG. 1, in connection with processing the composite API request, the composite API 112 is configured, by the composite engine 110, to generate API requests for each of the APIs 108a-c (broadly, resource or secondary API requests), in response to the composite API request and based on successful verification of the client. The composite API 112 is configured, by the composite engine 110, to generate the secondary API requests based, at least in part, on the configuration file 114 and the composite API request. In particular, when the composite API request is received by the composite API 112 from the banking institution 104, the composite API 112 is configured, by the composite engine 110, to access the configuration file 114 and associate each composite parameter in the body of the composite API request with one or more of the parameter configuration rule sets for APIs 108a-c in the configuration file 114, in order to identify the APIs 108a, b, and/or c that each composite parameter relates to. In connection therewith, the composite API 112 is configured, by the composite engine 110, to identify the composite parameters in the body of the API request that relates to each API 108a-c based on the relationships between the composite parameters and the APIs 108a-c defined in the configuration file 114. For each of APIs 108a-c, the composite API 112 is then configured to generate an API request for the respective API 108a, b, or c. The API requests generated by the composite API 112 for the APIs 108a-c are referred to herein as resource API requests (or secondary API requests).

In the exemplary embodiment, the composite API 112 is configured, by the composite engine 110, to generate one or more resource API requests for each of the APIs 108a-c based, at least in part, on the composite API request and the accessed configuration file 114. In connection therewith, the composite API 112 is configured, by the composite engine 110, to include a plurality of segments in the resource request(s) for each API 108a-c. For the resource request(s) for each API 108a-c, the segments include a uniform resource locator (URL) (or a uniform resource indicator (URI)), a method, a list of headers, and a body. The URL incudes a specification of the resource(s) requested by the banking institution 104 (e.g., for the resource request for Consent Services sought by the banking institution 104 as part of enrolling a client in the loyalty services, a URL for the API 108c, etc.). The method includes a specification of the action requested by the banking institution 104 (e.g., GET (retrieve a resource), POST (create a new resource), PUT (edit/update an existing resource), DELETE (delete a resource), etc.). The list of header(s) of each resource API request provides meta-information about the resource API request, (e.g., an authorization credential(s) of the banking institution 104 for the resource requested; an API response format requested by the client; an API response media type requested (e.g., text/HTML or text/JSON); etc.). And, the body of each resource API request includes parameters or variables (broadly, resource parameters), in association with data values, submitted to the API for use in carrying out the request.

In particular, for each API 108a-c, the composite API 112 is configured, by the composite engine 110, to include, in the body of the resource API request(s), the resource request parameters associated with the composite request parameters, as defined in the resource request parameter configuration rule set for the respective API 108a, b, or c in the configuration file 114. For each API 108a-c, the composite API 112 is also configured, by the composite engine 110, to include, in the body of the resource API request(s), the values for the composite request parameters, as the values for the resource request parameters included in the body of the resource API request(s). For example, based on the example Loyalty Services Request Parameter Configuration Rule Set for the example configuration file 114, the composite API 112 is configured to include the "addressLine1," "city," "country," "postalCode," "and "state" parameters in the resource request for the Loyalty Services API 108c, each in association with the value specified for the "streetAddress," "locality," "country," "postalCode," and "region" parameters, respectively, in the composite API request.

The composite engine 110 also includes one or more route configuration files. The route configuration files include the URLs (or URIs) for APIs 108a-c. In connection therewith, the composite API 112 is configured, by the composite engine 110, to include in each resource request for the APIs 108a-c the corresponding URL from the route configuration files. The composite API 112 is further configured, by the composite engine 110, to include the same authorization credential from the composite API request (e.g., the PKCS #12 key from the banking institution 104, etc.) in the list of headers for each resource request for APIs 108a-c. The composite API 112 is then configured, by the composite engine 110, to transmit (or route) each resource API request to the associated API 108a, b, or c via the payment network 102 based on the route configuration files and, in particular, based on the URLs from the route configuration files (as included in the resource API requests).

In one or more embodiments, the composite API 112 may be configured, by the composite engine 110, to route the resource API requests to the APIs 108a-c using a software balancer, where the software balancer includes the same authorization credential from the composite API request (e.g., the PKCS #12 key from the banking institution 104, etc.). In connection therewith, the software balancer may be configured, on behalf of the composite engine 110 and/or composite API 112, to include that same authorization credential in the resource API requests propagated to the APIs 108a-c.

In connection with the above, it should be appreciated that that the composite engine 110 is configured to define the parameter configuration rule sets included in the configuration file 114 (e.g., based on the composite parameters received as one or more inputs from the banking institution 104, etc.), prior to the receipt of the composite API request, such that the parameter configuration rule sets are predefined. Then, when the composite API request is received by the composite API 112 from the banking institution 104, the composite API 112 is configured, by the composite engine 110, to generate the individual resource requests for the APIs 108a-c (broadly, transform the composite API request) as part of a time execution, whereby payload data for the composite API request is included in the individual resource requests, consistent with the above.

Each of the APIs 108a-c is then configured to, in response to receiving the corresponding resource API request(s) (i.e., from the composite API 112), verify authorization of the call to the respective API 108a, b, or c based on the authorization credential(s) included in the resource request and, upon successful verification, process the resource API request(s) in accordance with the segments included therein (including the resource parameters and data values determined to be associated therewith by the composite API 112). Also consistent with the above, upon processing the corresponding resource API request(s), each of the APIs 108a-c is configured to generate and return a response, via the payment network 102, to the composite API 112, which submitted the resource API request(s) to the respective API 108a, b, or c. The responses from the APIs 108a-c may be referred to herein as the resource responses (or secondary responses). In the exemplary embodiment, the resource response of each API 108a-c is again formatted in accordance with the JSON format and includes a plurality of segments, including a status code (e.g., in a status-line segment, etc.), a list of header(s), and a body. The status code for each resource response indicates the status of the resource request requested by the composite API 112, including whether the service processing was successful or failed. The header list of each resource response provides meta-information about the response (e.g., response type (e.g., text/HTML or text/JSON, etc.), etc.), thereby indicating how the composite API 112 is to interpret the response. And, the body of each resource response includes parameters or variables, each in association with a data value, consistent with the example parameters and values in Table 4 above and the Computer Code Appendix below.

With that said, after submitting the resource API request(s) to each of the APIs 108a-c, the composite API 112 is configured, by the composite engine 110, to wait for the response from each of the APIs 108a-c. In connection with waiting for the response from each of the APIs 108a-c, the composite API 112 is configured, by the composite engine 110, to set a timeout, during which the composite API 112 delays responding to the banking institution's composite request until the responses from each of the APIs 108a-c are received. In one or more other embodiments, the timeout may be of a predefined duration, whereby the composite API 112 may be configured, by the composite engine 110, to transmit a response to the banking institution 104 in response to the composite API request when the timeout expires (e.g., in the case where one of the APIs 108a-c does not respond to the composite API 112 (e.g., due to an error, etc.), etc.).

Upon receiving the resource responses from each of the APIs 108a-c, the composite API 112 is configured, by the composite engine 110, to generate a composite response for the banking institution 104, which submitted the composite API request to the composite API 112. The response for the banking institution 104 is referred to herein as the composite response. The composite response is again formatted in accordance with the JSON format and includes a plurality of segments, including a status code (e.g., in a status-line segment, etc.), a list of header(s), and a body. The status code indicates the status of the composite request, including whether the service processing was successful or failed. For example, as explained in more detail below, when each of the APIs 108a-c returns a status code (e.g., 200, etc.) indicating success in the resource responses to the composite API 112, the composite API 112 is configured, by the composite engine 110, to include a status code (e.g., 200, etc.) indicating that the service processing was successful. The list of header(s) provides meta-information about the composite response (e.g., response type (e.g., text/HTML or text/JSON, etc.), etc.), thereby indicating how the banking institution 104 is to interpret the composite response. And, the body of the composite response includes a composite (or aggregation) of the data values (potentially, in association with the corresponding parameters or variables returned by each of the APIs 108a-c to the composite API 112 (e.g., the example data values (and/or parameters/variables associated therewith) in Table 4 above and the Computer Code Appendix below, but aggregated into a single body of the composite API response (as opposed to multiples bodies of multiple responses from individual APIs); etc.).

In connection with generating the composite response for the banking institution 104, the composite API 112 is configured by the composite engine 110 to include the status code indicating the status of the composite response based on the configuration file 114 and, in particular, a status code configuration rule set included in the configuration file 114 and each of the resource response from the APIs 108a-c. In particular, in the example system 100, each of the APIs 108a-c is configured, for example, to return a status code of 200 when the resource request was successfully completed, a status code of 400 when the resource request was invalid (e.g., due to incorrect resource parameters, etc.), or a status code of 500 when the request was not completed due to an internal error (e.g., a server side error, etc.). Instead of delivering each of the individual status codes returned to the composite API 112 from the individual APIs 108a-c, the composite API 112 is configured, by the composite engine 110, to access the configuration file 114 in memory 204 (e.g., coupled to the composite engine 110 and/or composite API 112, etc.) and include a composite status code based on the status code configuration rule set and the status codes included in the resource responses from APIs 108a-c.

An example status code configuration rule set is conceptually illustrated below in Table 6.

TABLE 6

| Consent Services API 108a: Status Codes | Consent Services API 108b: Status Codes | Loyalty Services API 108c: Status Codes | Composite API 112: Status Codes |
|---|---|---|---|
| 200 | 200 | 200 | 200 |
| 200 | 400 | 200 | 400 |
| 200 | 500 | 200 | 500 |
| 200 | TIME_OUT | 200 | 500 |
| 400 | 400 | 200 | 400 |
| 400 | 500 | 500 | 500 |
| 500 | 500 | 200 | 500 |

The status code configuration rule set defines a relationship between potential composite status codes and the potential status codes returned by the APIs 108a-c. As one example, and as defined in the first row of Table 6, when each of the APIs 108a-c returns a resource response to the composite API 112 of 200 indicating that the API 108a, b, or c successfully completed the resource request, the composite API 112 is configured, by the composite engine 110 and based on the status code configuration rule set, to include a composite status code of 200 in the composite API response, indicating that the composite API request was successfully completed. As another example, and as defined in the second and fifth rows of Table 6, when one or more of the APIs 108a-c returns a resource response(s) to the composite API 112 of 400 indicating that the resource request(s) was invalid, and the other one(s) of APIs 108a-c return a resource response(s) to the composite API 112 of 200 indicating that the resource request was successfully completed, the composite API 112 is configured, by the composite engine 110 and based on the status code configuration rule set, to include a status code of 400 in the composite API response, indicating that the composite API request was invalid (at least in part, due to one or more invalid resource API requests).

As a further example, and as defined in the sixth row of Table 6, when one or more of the APIs 108a-c returns a resource response(s) to the composite API 112 of 500 indicating that the resource request(s) was not completed due to an internal error and the other one(s) of the APIs 108a-c returns a resource response(s) to the composite API 112 of 400 indicating that the resource request was invalid, the composite API 112 is configured, by the composite engine 110 and based on the status code configuration rule set, to include a status code of 500 in the composite API response, indicating that the composite API request was not completed due to an internal error (e.g., at least in part due to a server side error, etc.). In addition, as defined in the fourth row of Table 6, when the time-out set by the composite API 112 expires (as discussed above) before one of the APIs 108a-c responds to a resource API request (e.g., API 108b, etc.), the composite API 112 is configured, by the composite engine 110 and based on status code configuration rule set, to include a status code of 500 in the composite API response, indicating that the composite API request was not completed due to an internal error (e.g., at least in part due to a server side error causing a time-out as a result Consent Services halting, etc.).

In connection with the above, it should be appreciated that when the resource responses are received by the composite API 112 from the APIs 108a-c, the composite API 112 is configured, by the composite engine 110, to generate the composite API response as part of a run time execution, whereby the payload data for the resource response(s) is included in the composite API response, consistent with the above.

What's more, in one or more embodiments, the banking institution 104 may be configured to store data values returned by the APIs 108a-c in a database having one or more consumer data tables (e.g., with confirmatory data related to loyalty services enrollment, etc.). Each data table may store data values returned by the APIs 108a-c for multiple consumers of the banking institution 104 (e.g., for multiple consumers enrolled in the loyalty services). In particular, a row of each table may be assigned to one of the multiple consumers. The row for the consumer, then, may include a plurality of column fields, where each field name represents a different data parameter, and each field value represents consumer data for the parameter. Table 7 includes example data table field names and values associated therewith as may be included in an enrollment confirmation data table of the database of the banking institution 104.

TABLE 7

| Data Table Field Name | Data Value |
|---|---|
| streetAddress | 1111 Sample Blvd. |
| locality | O'Fallon |
| country | USA |
| postalCode | 63368 |
| region | MO |
| value | sally.cardholder@domain.com |
| givenName | Sally |
| familyName | Cardholder |
| pan | 1111222333444 |
| cardExpiryDate | January 2023 |
| nameOnCard | Sally D Cardholder |
| ica | 1234 |
| cardProductType | MasterCard Business |
| accountType | JointMember |
| dateOfEnrollment | 2019 Feb. 3 |

However, one or more APIs 108a-c may be configured, in one or more embodiments, to return data values in association with parameters or variables, where the data values are consistent with the data value types stored for the field names in the example enrollment data of Table 7, yet where the parameters or variables are incompatible with the field name conventions in the enrollment data table.

To accommodate these types of incompatibilities, the composite engine 110 may be configured to generate the composite API 112 (broadly, again, a composite interface) for the banking institution 104 (broadly, again, for a client) based on a configuration file 114 stored in a memory 204 (e.g., coupled to the composite engine 110, etc.) that includes, in addition to the resource request parameter configuration rule sets, a response parameter configuration rule set for each of the APIs 108a-c that associates (or links) each resource response parameter configuration rule set with the respective API 108a, b, or c. Exemplary code segments are illustrated below for a resource response configuration rule set for Loyalty Services API 108c.

Loyalty Services Response Parameter Configuration Rule Set

```
{
    "operation": "shift",
    "spec": {
        "data": {
            "user": {
                "addresses": {
                    "*": {
                        "addressLine1": "StreetAddress",
                        "city": " locality ",
                        "country": "country",
                        "postalCode": "postalCode",
                        "state": " region "
                    }
                },
                "emails": {
                    "*": {
                        "value": "email"
                    }
                },
                "name": {
                    "firstName": " givenName ",
                    "lastName": " familyName "
                }
            }
        },
    }
}
```

Consistent with the above, each resource response parameter configuration rule set defines a relationship between one or more resource response parameters returned by the respective API 108, b, or c (e.g., the resource parameters identified in Table 4 and the Computer Code Appendix below, etc.) and one or more parameters to be returned by the composite API 112. Each resource response parameter configuration rule set also defines a relationship between the resource response parameters and the composite response parameters included therein and the corresponding API 108a, b, or c. In the example system 100, the configuration file 114 may include a similarly structured resource response parameter configuration rule set for APIs 108a and b. The composite engine 110 may be configured to include and/or modify composite response parameters in the configuration file 114 for each resource response parameter configuration rule set for APIs 108a-c based on one or more inputs from the banking institution 104, consistent with the explanation above in relation to the banking institution 104 being permitted to submit and/or identify specific, customized composite parameters that are consistent with the conventions of the banking institution 104.

With that said, for each API 108a-c, the composite API 112 may be configured, by the composite engine 110, to include, in the body of the composite API response, the composite response parameters associated with the resource response parameters, as defined in the resource response parameter configuration rule set for the respective API 108a, b, or c in the configuration file 114. For each API 108a-c, the composite API 112 may also be configured, by the composite engine 110, to include, in the body of the resource API request(s), the values for the resource response parameters, as the values for the composite response parameters included in the body of the resource API request(s). For example, based on the example segment shown above for a Loyalty Services Resource Response Parameter Configuration Rule Set, the composite API 112 may be configured to include the "streetAddress," "locality," "country," "postalCode," "and "region" parameters in the composite API response, each in association with the value specified for the "addressLine1," "city," "country," "postalCode," and "state" response parameters for API 108c, respectively. For example, the Loyalty Services API 108c may be configured to return the "1111 Sample Blvd." "O'Fallon," and "region" data values in association with the "saddressLine1," "city," and "state," parameters/variables, respectively. The Loyalty Services API 108c may also be configured to return the "Sally" and "CardHolder" data values in association with the "firstName" and "lastName" parameters/variables, respectively.

Regardless of content, the composite API 112 is then configured, by the composite engine 110, to transmit the composite response to the banking institution 104 via the network 106. An example segment of a body of a Composite API Response is shown below. In this example, it should be appreciated that the composite AIP 112 was configured, by the composite engine 110, to generate the composite API response based on the resource response configuration rule sets in the configuration file 114. Although not shown in the example segment below, the composite API response also includes, in this example, a status code of 200, indicating that the composite API request was successfully processed.

Composite API Response

```
{
    "data": {
        "user": {
            "active": false,
            "addresses": [
                {
                    "country": "USA",
                    "locality": "O'Fallon",
                    "postalCode": "63368",
                    "primary": false,
                    "region": "MO",
                    "streetAddress": "1111 Sample Blvd."
                }
            ],
            "emails": [
                {
                    "primary": false,
                    "value": "sally.cardholder@domain.com "
                }
            ],
            "userId": "bankingIntitution104",
            "externalId": "027ac851aa329a4ec6ff",
            "id": "bf4b458836193167b4cc684bb5a8096a474bc6ff",
            "name": {
                "familyName": "Cardholder",
                "givenName": "Sally"
            },
            "preferredLanguage": "en-US",
            "userName": "027ac851aa329a4ec6ff@gmail.com"
        },
```

| Composite API Response |
| --- |
| "products": [<br>  {<br>    "product": "benefits",<br>    "object": {<br>    }<br>  }<br>  ]<br>}<br>} |

The computing system of the banking institution 104 that submitted the composite API request is then configured to react according to the composite response received from the composite API 112 (e.g., notifying the consumer that he/she has been authorized for loyalty services at the payment network 102 when the status code of the composite response indicates successful processing, etc.).

FIG. 3 illustrates an exemplary method 300 for bundling different resource interfaces to a composite API and for facilitating API interactions in connection therewith. The exemplary method 300 is described (with reference to the system 100 of FIG. 1) as implemented in the composite engine 110 of the system 100, with additional reference to the composite API 112, the APIs 108a-c of the payment network 102, and the banking institution 104 (broadly, a client), and with further reference to the computing device 200. As should be appreciated, however, the methods herein should not be understood to be limited to the exemplary system 100 or the exemplary computing device 200, and the systems and the computing devices herein should not be understood to be limited to the exemplary method 300.

With that said, in the example method 300, the banking institution 104 stores consumer data parameters for a consumer of the banking institution 104 in a database having a data table and, in particular, a row thereof that is assigned to the consumer. The row includes a plurality of fields, including fields identified by data table field names, for example, as shown above in Table 5 (e.g., streetAddress, locality, country, etc.). Each field includes a value(s) associated therewith, such as, for example, the data values shown above in Table 7 (e.g., "1111 Sample Blvd." associated with the "streetAddress" field, etc.). In one or more other embodiments, the consumer data parameters, and associated values, may be stored or accessed otherwise (or even not stored by the banking institution 104 at all (e.g., where the banking institution 104 receives the values for consumer data parameters via a user interface through which the consumer submits the consumer data parameters, etc.)).

Initially in the method 300, banking institution 104 submits, at 302, a plurality of composite parameters to the composite engine 110, and the composite engine 110 receives the composite parameters (e.g., in response to a solicitation by the composite engine 110, as part of an API request to the composite engine 110, via one or more GUIs, etc.). In this example, the composite parameters are each submitted to and/or received by the composite engine 110 in association with one or more resource parameters required and/or accepted by the APIs 108a-c. In addition, the composite parameters have names/formats that are consistent with the names/formats of the consumer data parameters (and enrolment confirmation data parameters) stored in the database of the banking institution 104.

At 304, the composite engine 110 generates and/or updates, modifies, etc., a configuration file 114 having a plurality of resource request and response parameter configuration rule sets based on the received composite parameters. Consistent with the above, each parameter configuration rule set defines a relation between one or more resource parameters required, accepted, and/or returned by the respective API 108a, b, or c and one or more parameters for the composite API 112 (broadly, composite parameters). Each parameter configuration rule set also defines a relationship between the resource parameters and composite parameters included therein and the corresponding API 108a, b, or c.

In turn, the composite engine 110 generates, at 306, a composite API 112. In connection with generating the composite API 112, the composite engine 110 defines the composite API 112 to accept and/or require each composite request parameter (e.g., "streetAddress," "locality," "country,", etc.) identified in the configuration file 114 and, in particular, each of the resource request parameter configuration rule sets. In the example method 300, the composite engine 110 also defines the composite API 112 to return each composite response parameter identified by the configuration file 114 and, in particular, each of the resource response parameter configuration rule sets.

Separately, the banking institution 104 receives, at 308, a request from the consumer to enroll in a loyalty service (e.g., Boingo® Global WiFi or MCAE services, etc.) for a payment card associated with the consumer and issued by the banking institution 104. In response to the request, the banking institution 104 accesses, at 310, consumer data parameters, and the data values associated therewith for the consumer from the database, consistent with the above and, for example, as shown in Table 5. The banking institution 104 also generates, at 312, an API request for the composite API 112 (broadly, a composite or primary API request). In generating the composite API request, the banking institution 104 includes at least the accessed consumer data parameters, and the data values associated therewith, in the composite API request, as well as a URL (or URI) specifying the composite resources requested by the banking institution 104, and authorization credential(s) (e.g. a PKCS #12 key, etc.) for the banking institution 104 to access the composite resources.

In this example, the consumer data parameters, and the data values associated therewith, are included in segments of the composite API request formatted in accordance with the JSON format, consistent with the above. The accessed consumer data parameters are included in the composite API request as composite request parameters in association with the data values in the body of the composite API request. The URL (or URI) is included in a URL segment of the composite API request, and the authorization credential(s) are included in a segment of the composite API request (e.g., in a list of headers).

As will be appreciated, composite parameters included in the composite API request are named/formatted consistent with the naming/formatting conventions of consumer data parameters accessed from the database of the banking institution 104, which, in turn, are consistent with composite parameters submitted by the banking institution 104 to the composite engine 110 at 302.

Next, the banking institution 104 transmits, at 314, the composite API request to the composite API 112 at the payment network 102 via the network 106, and the composite API 112 receives the composite API request. In response, the composite API 112 verifies, at 316, the banking institution's authorization to call the composite API 112 based on the authorization credential(s) included in the composite API request (and in, particular, in the list of header(s) of the composite API request), consistent with the above. Upon successful verification, the composite API 112 generates, at 318, a plurality of resource (or secondary) API requests for APIs 108*a-c* based, at least in part, on the configuration file 114 and the composite API request, consistent with the above. In connection with generating the resource API requests for APIs 108*a-c*, the composite API 112 accesses the configuration file 114 and associates each composite parameter in the body of the composite API request with one or more parameter configuration rule sets for APIs 108*a-c* in the configuration file 114, in order to identify the APIs 108*a*, *b*, and/or *c* that each composite parameter relates to. The composite API 112 identifies the composite request parameters in the body of the composite API request that relate to each API 108*a-c* based on the relationships between the composite parameters and the APIs 108*a-c* defined in the configuration file 114.

Also in connection with generating the resource API requests for APIs 108*a-c*, the composite API 112 includes a plurality of segments in the resource request(s) for each API 108*a-c*. For the resource request(s) for each API 108*a-c*, the segments include a URL (or URI), a method, a list of headers, and a body. The URL incudes a specification of the resource(s) requested by the banking institution 104 (e.g., for the resource request for Consent Services sought by the banking institution 104 as part of enrolling a client in the loyalty services, a URL for the API 108*a*, etc.). The method includes a specification of the action requested by the banking institution 104 (e.g., GET (retrieve a resource), POST (create a new resource), PUT (edit/update an existing resource), DELETE (delete a resource), etc.). The list of header(s) provides meta-information about the resource API request, (e.g., authorization credential(s) of the banking institution 104 for the resource requested; an API response format requested by the client; an API response media type requested (e.g., text/HTML or text/JSON); etc.). And the body of each resource API request includes parameters or variables (broadly, resource parameters), in association with data values, submitted to the API for use in carrying out the request.

Further, for each API 108*a-c*, the composite API 112 includes, in the body of the resource API request(s) for the respective API 108*a*, *b*, or *c*, the resource request parameters associated with the composite request parameters, as defined in the resource request parameter configuration rule set for the respective API 108*a*, *b*, or *c* in the configuration file 114. For each API 108*a-c*, the composite API 112 includes, in the body of the resource API request(s), the values for the composite request parameters, as the values for the resource request parameters included in the body of the resource API request(s).

Then in the method 300, the composite API 112 transmits, at 320, 322, and 324, each generated resource API request to the associated API 108*a*, *b*, or *c* via the payment network 102, and the corresponding API 108*a*, *b*, or *c* receives the resource API request. After the composite API 112 transmits the resource API requests to the APIs 108*a-c*, the composite API 112 sets, at 326, a timeout to wait for each resource response from the APIs 108*a-c* before responding to the banking induction 104.

Meanwhile, each of the respective APIs 108*a-c*, in response to receiving the corresponding resource API request(s), processes, at 328, 330, and 332, the resource API request(s) in accordance with the segments included therein (including the resource parameters and data values determined to be associated therewith by the composite API 112).

Upon processing the corresponding resource API request(s), each of the APIs 108*a-c* generates, at 334, 336, and 338, a resource response(s) and transmits, at 340, 342, and 344, the resource response(s), via the payment network 102, to the composite API 112, and the composite API 112 receives the resource response(s). In this example, the response(s) are again formatted in accordance with the JSON format and includes a plurality of segments, including a status code, a list of header(s), and a body. The status code indicates the status of the resource request requested by the composite API 112, including whether the service processing was successful or failed. The header list of header(s) provides meta-information about the response (e.g., response type (e.g., text/HTML or text/JSON, etc.), etc.). And, the body of each resource response includes parameters or variables, each in association with a data value, consistent with the example parameters and values in Table 4 above and the Computer Code Appendix below.

Upon receiving each resource response from the APIs 108*a-c*, the composite API 112 generates, at 346, a composite response for the banking institution 104, consistent with the above. The composite response is again formatted in accordance with the JSON format and includes a plurality of segments, including a status code (e.g., 200, 400, or 500), a list of header(s), and a body. The status code is included based on a status code configuration rule set, as described above, and indicates the status of the composite request, including whether the service processing was successful or failed. And, the body of the composite response includes a composite (or aggregation) of parameters or variables, in association with the data values returned by each of the APIs 108*a-c* to the composite API at 340, 342, and 344, but aggregated into a single body of the composite API response (as opposed to multiples bodies of multiple responses from individual APIs). As noted, in the example method 300, the composite engine 110 also defines the composite API 112 to return each composite response parameter identified in the configuration file 114 and, in particular, each of the resource response parameter configuration rule sets. As such, in generating the composite response for the banking institution 104, the composite API 112 associates each of the data values with a composite response parameter, based on the campsite resource parameter configuration rule sets. The campsite API 112, then, includes each of the composite response parameters, in lieu of the corresponding resource request parameters, in the composite API response.

The composite API 112 then terminates the timeout and transmits the composite response to the banking institution 104, at 348, via the network 106, and the banking institution 104 receives the composite response. The banking institution 104 then reacts according to the composite response received from the composite API 112 (e.g., stores the composite response parameters in association with their values in enrollment conformation data table for the consumer and notifies the consumer that he/she has been authorized for the loyalty service at the payment network 102 when the status code of the composite response indicates successful processing, etc.).

Again, and as previously described, it should be appreciated that the functions described herein, in some embodiments, may be described in computer executable instructions stored on a computer-readable media, and executable by one or more processors. The computer-readable media is a non-transitory computer-readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing at least one of the following operations: (a) receiving, by a computing device, a primary API request from a client, the primary API request including a plurality of composite request parameters in association with a plurality of values; (b) generating, by the computing device, a plurality of secondary API requests based on a configuration file and the primary API request, the configuration file defining a relationship between the plurality of composite request parameters and a plurality of resource request parameters associated with a plurality of resource interfaces; (c) transmitting, by the computing device, the plurality of secondary API requests to the plurality of resource interfaces; (d) receiving, by the computing device, a plurality of secondary responses from the plurality of resource interfaces to plurality of secondary requests; and (e) generating, by the computing device, a primary API response for the client, the primary API response based on the plurality of secondary responses; and (f) transmitting, by the computing device, the primary API response to the client.

Exemplary embodiments are provided so that this disclosure will be thorough, and will fully convey the scope to those who are skilled in the art. Numerous specific details are set forth, such as examples of specific components, devices, and methods, to provide a thorough understanding of embodiments of the present disclosure. It will be apparent to those skilled in the art that specific details need not be employed, that example embodiments may be embodied in many different forms, and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" as well as the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Computer Code Appendix

Lifecycle Services API 108b: Resource Response Parameters

```
{
    "id": "44e15e022bb10c4ba334f7e823d4ae76dc67c6ff",
    "externalId": "some-external-id",
    "meta": null,
    "version": null,
    "schemas": {"urn:ietf:params:scim:schemas:core:2.0:User"},
    "userName": "sally.cardholder@domain.com",
    "name": {
        "formatted": null,
        "familyName": "Cardholder",
        "givenName": "Sally",
        "middleName": "S",
        "honorificPrefix": "Ms.",
        "honorificSuffix": "Sr."
    },
    "displayName": "Sally Cardholder",
    "nickName": "Sal",
    "profileUrl": "https://www.example.com/profile/sallycardholder",
    "title": " ",
    "userType": "B2C",
    "preferredLanguage": "en_US",
    "locale": "en_US",
    "timezone": "America/Chicago",
    "active": true,
    "password": null,
```

```
"emails": [{
  "type": "work",
  "primary": false,
  "operation": null,
  "value": "sally.cardholder@domain.com",
  "display": "sally.cardholder@domain.com",
  "ref": null
}],
"phoneNumbers": [{
  "type": "work",
  "primary": true,
  "operation": null,
  "value": "tel:+16365555555",
  "display": "blocked caller",
  "ref": null
}],
"ims": [{
  "value": "IM Value",
  "display": "IM Away",
  "primary": true,
  "type": "aim"
}],
"photos": [{
  "value": "https://photos.example.com/profilephoto/3059933000000AdE/F",
  "display": null,
  "primary": null,
  "type": "photo"
}],
"addresses": [{
  "type": "work",
  "primary": false,
  "operation": null,
  "formatted": null,
  "streetAddress": "1111 Sample Blvd.",
  "locality": "O'Fallon",
  "region": "MO",
  "postalCode": "63368",
  "country": "US",
  "ref": null
}, {
  "type": "home",
  "primary": false,
  "operation": null,
  "formatted": null,
  "streetAddress": "123 Picket Fence Lane",
  "locality": "St. Louis",
  "region": "MO",
  "postalCode": "63123",
  "country": "US",
  "ref": null
}],
"groups": [{
  "value": "group",
  "display": null,
  "type": null,
  "$ref": null
}],
"entitlements": [ ],
"roles": [{
  "value": "role",
  "display": null,
  "primary": null,
  "type": null
}],
"x509Certificates": [{
  "value": null,
  "display": null,
  "primary": null,
  "type": null
}],
"tenantId": "bd583ffe63f2af9c63902475361acdf9f3f0c6ff",
"personalInformation": {
  "gender": "m",
  "dateOfBirth": "1970-01-01",
  "identifications": [{
    "value": "123456789",
    "type": "ssn",
    "country": "US"
  }]
},
"preferenceInformation": {
  "communicationOptions": [{
    "type": "general",
    "channelId": "email",
    "optedIn": false,
    "optedInDate": null
  }]
},
"programInformation": {
  "programs": [{
    "id": "6a4a423fac2d2e02a236f4bbdc5a749b055ec6ff",
    "created": null,
    "lastModified": null,
    "resourceType": "Program"
  }]
}
}
```

What is claimed is:

1. A computer-implemented method for use in facilitating application interface (API) interactions, the method comprising:

receiving, by a computing device, a primary API request from a client, the primary API request including a plurality of composite request parameters in association with a plurality of values;

identifying, by the computing device, relationships between the plurality of composite request parameters and a plurality of resource request parameters associated with a plurality of resource interfaces;

generating, by the computing device, a plurality of secondary API requests based on the primary API request and the identified relationships between the plurality of composite request parameters and the plurality of resource request parameters, the plurality of secondary API requests including the plurality of values based on the relationships between the plurality of composite request parameters and the plurality of resource request parameters;

transmitting, by the computing device, the plurality of secondary API requests to the plurality of resource interfaces;

receiving, by the computing device, a plurality of secondary responses from the plurality of resource interfaces to the plurality of secondary API requests;

generating, by the computing device, a primary API response for the client, the primary API response based on the plurality of secondary responses; and transmitting, by the computing device, the primary API response to the client.

2. The computer-implemented method of claim 1, wherein the primary API request includes at least two segments, a first one of the at least two segments including the plurality of composite parameters in association with the plurality of values, and a second one of the at least two segments including a URL for the computing device; and wherein transmitting the plurality of secondary API request includes routing the plurality of secondary API requests to the plurality of resource interfaces based on at least one route configuration file, the at least one route configuration file including the URL for each of the plurality of resource interfaces.

3. The computer-implemented method of claim 2, wherein the at least two segments of the primary API request include at least three segments, a third one of the at least three segments including an authorization credential for the client;

wherein the method further comprises verifying, by the computing device, the client based on the authorization credential; and wherein generating the plurality of secondary API request includes generating the plurality of secondary API requests in response to verifying the client.

4. The computer-implemented method of claim 3, wherein the computing device includes a composite API.

5. The computer-implemented method of claim 4, wherein each of the plurality of resource interfaces includes an API.

6. The computer-implemented method of claim 5, wherein each of the plurality of secondary responses includes a status code.

7. The computer-implemented method of claim 6, wherein the primary API response includes a status code based on the status codes included in the plurality of secondary responses.

8. The computer-implemented method of claim 7, further comprising including, by the computing device, the status code in the primary API response based on a status code configuration rule set included in the configuration file, the status code configuration rule set defining a relationship between the status codes included in the plurality of secondary responses and the status code included in the primary API response.

9. The computer-implement method of claim 7, wherein the plurality of secondary responses includes a plurality of resource response parameters; and wherein generating the primary API response includes generating the primary API response based on a relationship between the plurality of resource response parameters and a plurality of composite response parameters.

10. The computer-implemented method of claim 1, further comprising:

setting, by the computing device, a timeout after transmitting the plurality of secondary API requests to the plurality of resource interfaces; and transmitting, by the computing device, the primary API response to the client only when the timeout is unexpired.

11. The computer-implement method of claim 1, further comprising defining, by the computing device, the relationships between the plurality of composite request parameters and the plurality of resource request parameters based on one or more inputs from the client.

12. A system for use in facilitating application interface (API) interactions, the system comprising:

a memory including one or more parameter configuration rule sets and a status code configuration rule set;

at least one processor in communication with the memory, the at least one processor configured to:

receive a primary API request, the primary API request including a plurality of composite request parameters in association with a plurality of values;

identify, based on the one or more parameter configuration rule sets, relationships between the plurality of composite request parameters and a plurality of resource request parameters associated with a plurality of resource APIs;

generate a plurality of secondary API requests based on the identified relationships and the plurality of values;

transmit the plurality of secondary API requests to the plurality of resource APIs;

receive a plurality of secondary API responses from the plurality of resource APIs to the plurality of secondary API requests, the plurality of secondary API responses including a plurality of status codes and a plurality of resource response parameters in association with a plurality of values;

generate a primary API response based on the plurality of status codes included in the plurality of secondary API responses and the status code configuration rule set, the primary API response including a status code and a plurality of composite response parameters in association with the plurality of values included in the plurality of secondary API responses; and transmit the primary API response to a client.

13. The system of claim 12, wherein the one or more parameter configuration rule sets includes at least one resource request parameter configuration rule set, each of the at least one resource request parameter configuration rule set defining at least one of the relationships between the plurality of composite request parameters and the plurality of resource request parameters; and wherein the at least one processor is configured to, in connection with generating the plurality of secondary API requests, generate the plurality of secondary API requests based, at least in part, on the at least one resource request parameter configuration rule set.

14. The system of claim 12, wherein the one or more parameter configuration rule sets includes at least one resource response parameter configuration rule set, each of the at least one resource response parameter configuration rule set defining a relationship between at least one resource response parameter and at least one composite response parameter; and wherein the at least one processor is configured to, in connection with generating the primary API response, generate the primary API request based, at least in part, on the at least one resource response parameter configuration rule set.

15. The system of claim 12, wherein the status code configuration rule set defines a relationship between the status codes included in the plurality of secondary API responses and the status code included in the primary API response.

16. The system of claim 12, wherein the at least one processor is configured, for each of the one or more parameter configuration rule sets, to define the relationships between the plurality of composite request parameters and the plurality of resource request parameters based on one or more inputs from the client.

17. A non-transitory computer-readable storage medium including computer-executable instructions for use in facilitating application interface (API) interactions, which, when executed by a processor, cause the processor to:
- receive a plurality of composite parameters in association with a plurality resource parameters;
- include, in a configuration file, a resource parameter configuration rule set, the resource parameter configuration rule set defining a relationship between the plurality of composite parameters and the plurality of resource parameters;
- receive a primary API request from a client, the primary API request including one or more of the plurality of composite parameters in association with one or more values;
- generate a plurality of secondary API requests based on the resource parameter configuration rule set, the plurality of secondary API requests including one or more of the plurality of resource parameters related to the one or more composite parameters included in the primary API request;
- transmit the plurality of secondary API requests to a plurality of resource APIs;
- receive a plurality of secondary API responses from the plurality of resource APIs, the plurality of secondary API responses including one or more resource parameters in association with one or more values;
- generate a primary API response based on the one or more resource parameters included in the plurality of secondary API responses and the resource parameter configuration rule set; and
- transmit the primary API response to a client.

18. The non-transitory computer-readable storage medium of claim 17, wherein the plurality of secondary API responses includes a plurality of status codes;
- wherein the primary API response includes a status code;
- wherein the configuration file includes a status code configuration rule set defining a relationship between the plurality of status codes included in the plurality of secondary API responses and the status code included in the primary API response; and
- wherein the computer-executable instructions, when executed by the processor, cause the processor, in connection with generating the primary API response, to generate the primary API response based on the status code configuration rule set and the plurality of status codes included in the plurality of secondary API responses.

19. The non-transitory computer-readable storage medium of claim 17, wherein the plurality of secondary API responses includes one or more of the plurality of resource parameters included in the resource parameter configuration rule set; and
- wherein the computer-executable instructions, when executed by the processor, cause the processor, in connection with generating the primary API response, to generate the primary API response based on the one or more resource parameters included in the plurality of secondary API responses and the resource parameter configuration rule set, the primary API response including at least one of the one or more composite parameters included in the resource parameter configuration rule set in association with the one or more values included in the plurality of secondary API responses.

* * * * *